(12) United States Patent
Larsen et al.

(10) Patent No.: US 6,929,034 B1
(45) Date of Patent: Aug. 16, 2005

(54) COUPLING SYSTEM, KIT, AND METHOD

(76) Inventors: Richard R. Larsen, 4153 Shady La., Cookeville, TN (US) 38506; David M. Prowse, 1570 Boon Dr., Cookeville, TN (US) 38506

( * ) Notice: Subject to any disclaimer, the term of this patent is extended or adjusted under 35 U.S.C. 154(b) by 73 days.

(21) Appl. No.: 10/176,242

(22) Filed: Jun. 20, 2002

(51) Int. Cl.$^7$ .............................................. F16L 55/04
(52) U.S. Cl. .................... 138/30; 138/109; 138/121; 138/155; 285/227; 285/299; 285/903
(58) Field of Search ............................... 138/121, 109, 138/155, 120, 30; 285/226, 227, 228, 299, 285/903, 322

(56) References Cited

U.S. PATENT DOCUMENTS

| | | | | |
|---|---|---|---|---|
| 2,433,768 A | * | 12/1947 | Krupp ............................ | 2/2.14 |
| 2,437,385 A | * | 3/1948 | Halford ..................... | 282/121.1 |
| 2,890,900 A | * | 6/1959 | Williamson, Jr. et al. ... | 285/238 |
| 2,916,307 A | * | 12/1959 | Peters .......................... | 285/9.2 |
| 2,937,036 A | * | 5/1960 | Watkins ........................ | 285/41 |
| 3,235,270 A | * | 2/1966 | Williams et al. ................ | 165/9 |
| 3,277,927 A | * | 10/1966 | Schneider .................... | 138/121 |
| 3,642,309 A | * | 2/1972 | Horrobin et al. ............ | 285/226 |
| 3,712,481 A | * | 1/1973 | Harwood ..................... | 414/736 |
| 4,332,404 A | * | 6/1982 | Huffman ...................... | 285/223 |
| 4,598,428 A | * | 7/1986 | Vykukal ........................ | 2/2.12 |
| 5,056,834 A | * | 10/1991 | Scott et al. .................. | 285/325 |
| 5,133,579 A | * | 7/1992 | Anderson et al. ........... | 285/226 |
| 5,632,512 A | * | 5/1997 | Guitoneau ................... | 285/321 |
| 5,662,335 A | | 9/1997 | Larsen ........................... | 277/3 |
| 6,098,663 A | | 8/2000 | Larsen ......................... | 138/30 |
| 6,182,971 B1 | * | 2/2001 | Parker et al. ............... | 277/348 |
| 6,231,054 B1 | * | 5/2001 | Allen et al. ................. | 277/634 |
| 6,568,686 B2 | * | 5/2003 | Hadley ....................... | 277/370 |

* cited by examiner

*Primary Examiner*—James Hook
(74) *Attorney, Agent, or Firm*—Wadey & Patterson; Jason L. Hornkohl

(57) ABSTRACT

A coupling system, comprising: a first bellows element; a fluid handling component; and a coupling assembly releasably connecting the first bellows element to the fluid handling component for maintaining a secure connection between the first bellows element and the fluid handling component. The coupling assembly comprises a first flange attached to the first bellows element and a second flange attached to the fluid handling component, the first and second flanges alignable with each other to form a locking space; a locking member sized to fill the locking space; and a sealing structure positioned between the first bellows element and the fluid handling component to form a seal proximate the effective diameter of the first bellows element. A kit and a method for connecting a bellows element to a fluid handling component are also disclosed.

16 Claims, 6 Drawing Sheets

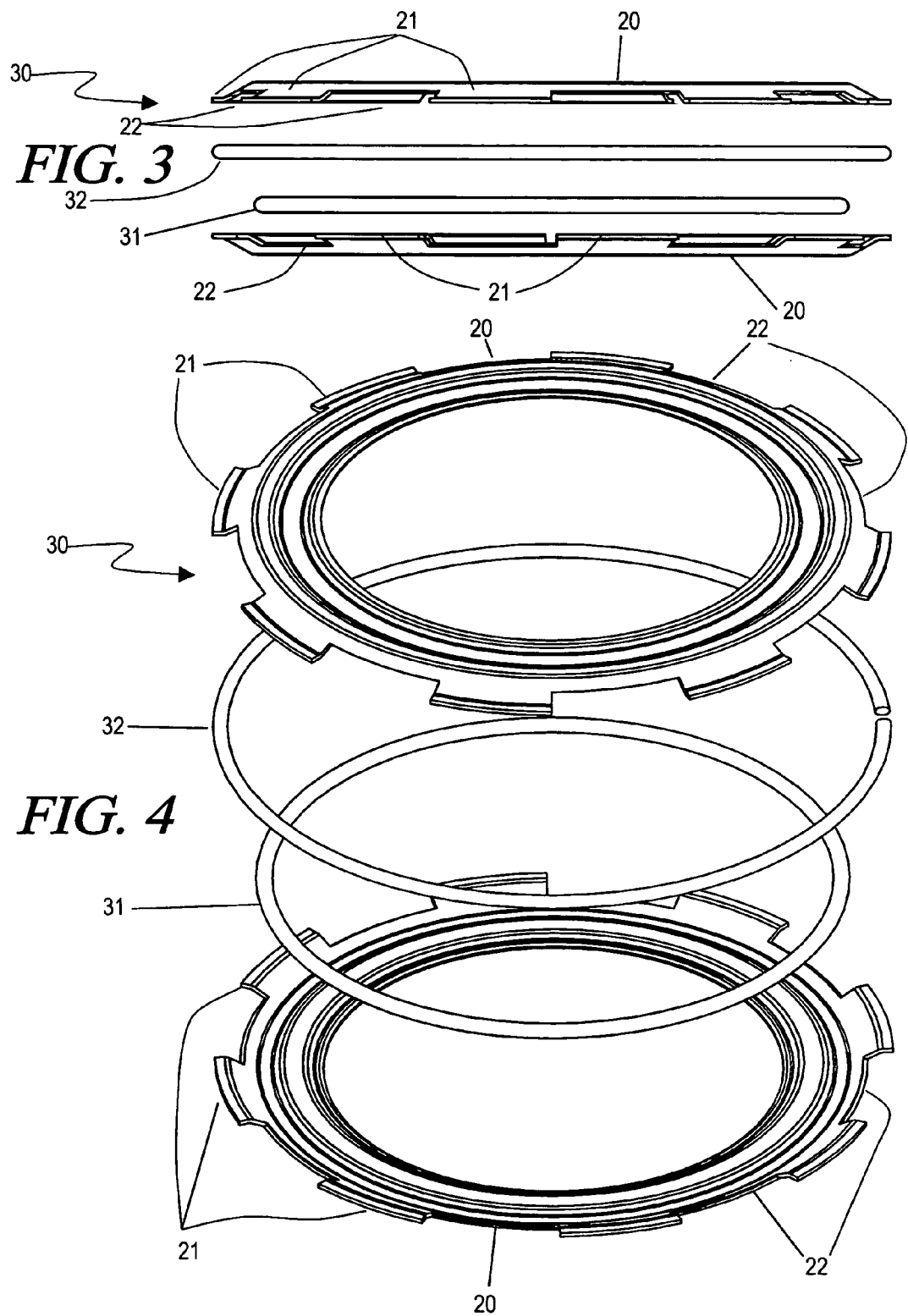

ial applications, but such couplings cannot be mounted in most cases, custom-engineered bellows often consume excessive space in their applications. This is a problem since in most such cases, bellows operate in a limited space at best.

COUPLING SYSTEM, KIT, AND METHOD

A portion of the disclosure of this patent document contains material that may be subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

Metal bellows have been used for many years in various fields of application. Metal bellows are valuable to the following areas of industry: altitude sensors, fuel control systems and other aircraft systems; spacecraft engine and electronic system applications; vacuum and semiconductor systems; medical applications such as angioplasty pumps; petrochemical valve applications; industrial sealing and industrial control systems; high voltage switchgear applications; valve seal systems; water hammer arrestor systems; diesel engines; and laboratory equipment systems. As a hermetically sealed, totally metallic flexible sealing instrumentality, metal bellows are very valuable in any system that requires strict environmental control, and especially in systems requiring high and ultra-high vacuum operational environments. One common incarnation of metal bellows, called "edge-welded" bellows, has been used successfully in all of these fields.

However, edge-welded bellows have historically been custom-manufactured to a particular application. Custom engineering an edge-welded bellows is a very time-consuming and expensive process, and the industries and applications in which such bellows are used often place time demands upon the maker of the bellows that interfere with the development cycles of the applications even in the best case scenario. In fact, custom-engineering a bellows has become a bottleneck item in many of these applications. Another problem posed by custom-engineering bellows has been that when such bellows are eventually made, the bellows is typically installed by welding the bellows in place in the application. Welding the bellows into the application becomes a problem when the bellows need to be replaced. Some bellows manufacturers have tried to manufacture off-the-shelf bellows that could be purchased and installed by their customers, but such bellows often require couplings that consume excessive space in their applications. This is a problem since in most such cases, bellows operate in a limited space at best.

What is needed, then, is a modular bellows system that allows for bellows to be manufactured in various standard sizes to be purchased and installed in an application quickly and with a high-quality, low-space-consuming seal, while at the same time providing a modular bellows that can be replaced quickly and easily by the end user of the bellows without undue expense of time and resources.

SUMMARY OF THE INVENTION

The present invention generally relates to a modular bellows system. More particularly, the present invention relates to a modular bellows system for releasably coupling a bellows to other system components. The system has the following basic structure: a pair of flanges that releasably mate together to form the coupling, a sealing structure sandwiched between the flanges to create a quality seal, and a locking member for holding the pair of flanges together to maintain the integrity of the seal. One of the flanges will normally be fixed to a bellows, and the other flange will typically be fixed to a fluid handling component such as a standard vacuum component or a second bellows.

Accordingly, it is an object of the present invention to provide a bellows coupling system that allows the bellows to perform as a high-quality component of a system.

It is a further object of the invention to provide a bellows coupling system that preserves a high-integrity seal between a bellows and other system components.

It is a further object of the invention to provide a bellows coupling system that may be assembled quickly.

It is a further object of the invention to provide a bellows coupling system that is modular.

It is a further object of the invention to provide a bellows coupling system that may be uncoupled quickly.

It is a further object of the invention to provide a bellows coupling system that is pre-engineered.

It is a further object of the invention to provide a bellows coupling system that does not require welding of the coupling to form a seal.

In addition to the foregoing, further objects, features, and advantages of the present invention should become more readily apparent to those skilled in the art upon a reading of the following detailed description in conjunction with the drawings, wherein are shown and described illustrated embodiments of the invention.

BRIEF DESCRIPTION OF THE DRAWINGS

FIG. 3 is an exploded plan view of an embodiment of the coupling system of the invention.

FIG. 4 is a perspective view of the coupling system of the invention shown in FIG. 3.

DESCRIPTION OF THE PREFERRED EMBODIMENTS

Figure 1:
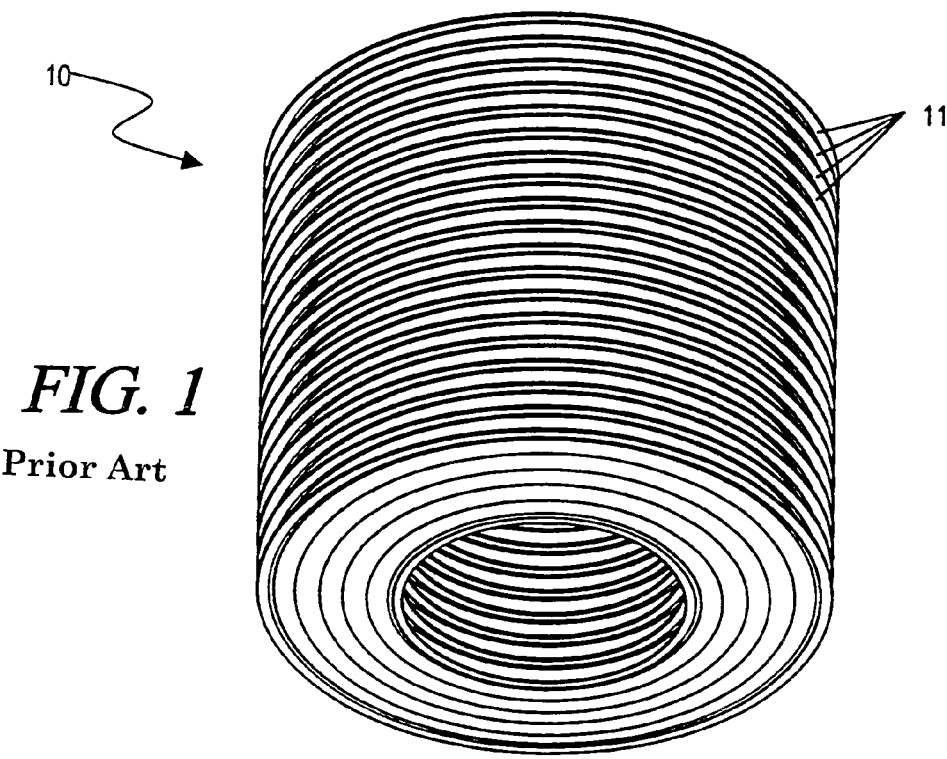
FIG. 1 is a perspective view of a standard edge-welded bellows.

Referring to FIG. 1, a standard edge-welded bellows 10 (also referred to as a "bellows capsule" in the literature and as a "bellows element" herein) is shown as a flexible, hollow cylindrical metal structure made of a number of convolutions 11. A type of metal normally used in such bellows is heat treated alloy 350 stainless steel. Convolutions 11 are specifically designed and made to provide for alternate expansion and contraction in a manner that is well known in the art. The bellows may be of any dimensions suitable for the application in which the bellows may be used. Variables of interest in making bellows include such conventional parameters as fatigue life, size, spring rate, operating force, and bellows effective area. The ends of bellows 10 are adapted to be connected to any of a variety of standard system components. As mentioned above, such connections are normally made by welding, or, in the case of formed bellows, by brazing, or soldering in the prior art.

Figure 2:
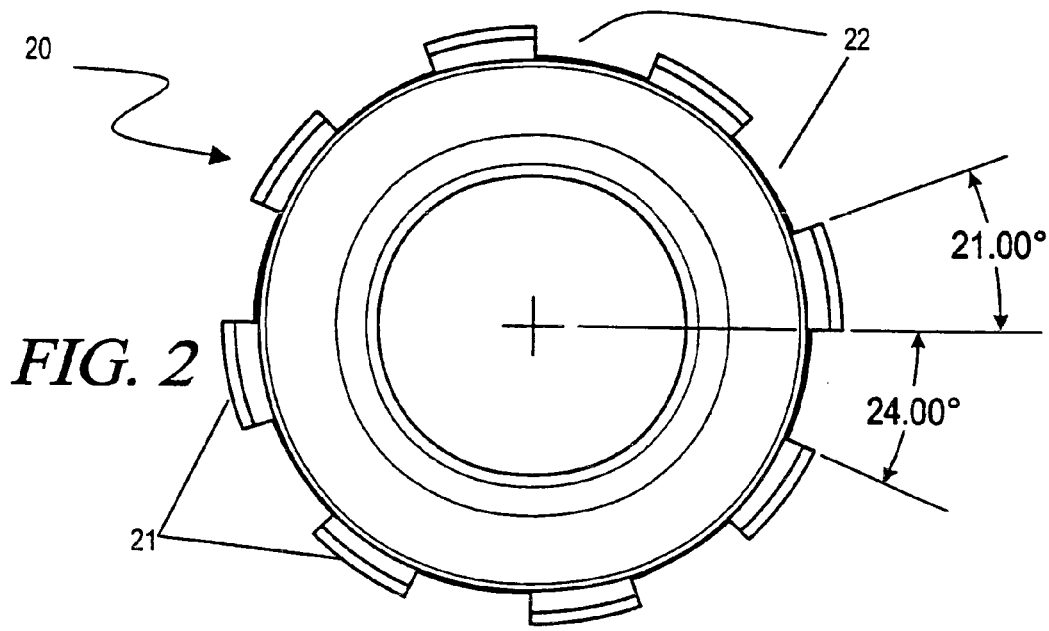
FIG. 2 is a plan view of an embodiment of a flange used in the coupling system of the invention.

Referring to FIG. 2, a flange 20 is shown, having a number of fingers 21 extending therefrom, separated by spaces 22. In the preferred embodiment, flange 20 is an essential element that will allow bellows 10 to be coupled to other system components. Flange 20 is designed to be a hermaphroditic connector; a pair of flanges 20 are mated by merely aligning the fingers 21 of a first flange with the spaces 22 of a second flange, then interlocking the flanges 20 together. In this manner, only one type of connector is required to be made for all couplings.

Referring to FIG. 3, the coupling assembly 30 of the invention is shown, with a pair of opposed flanges 20 being oriented such that they may be interlocked together in the manner described above relating to FIG. 2. It can be seen in plan view that flanges 20 are not planar; rather, flanges 20 have some depth to allow for the interlocking of fingers 21, as well as to provide a space for sealing the coupling. A sealing structure 31 such as a ring made of an elastomer or other resilient material is placed or sandwiched between flanges 20 to provide a high-integrity seal. In a preferred embodiment, flanges 20 provide a space for sealing structure 31 that is approximately radially halfway between the inner diameter and the outer diameter of flanges 20. This halfway point is referred to as the "effective diameter", a term referring to a point of neutral balance for the bellows. Placing sealing structure at a point other than the effective diameter may cause the coupling to fail. Further, the space provided by flanges 20 which is occupied by sealing structure 31 is somewhat thinner than sealing structure 31 so that as flanges 20 are mated, sealing structure 31 must be flattened slightly to mate flanges 20. Flanges 20 should be forced toward each other so that the fingers 21 interlock to form a locking groove that runs substantially the entire outer circumference of flanges 20. As the locking groove is manifested, a locking ring 32 made of an incomplete circle of material may be placed in the locking groove by opening locking ring 32, wrapped around the perimeter of coupling assembly 30, and then pressed into the locking groove to maintain the mated connection of flanges 20. In a preferred embodiment, locking ring 32 is made from a metal such as heat-treated stainless steel. In this manner, sealing structure 31 and locking ring 32 provide opposing forces that will maintain the desired seal of the coupling.

Figure 5:
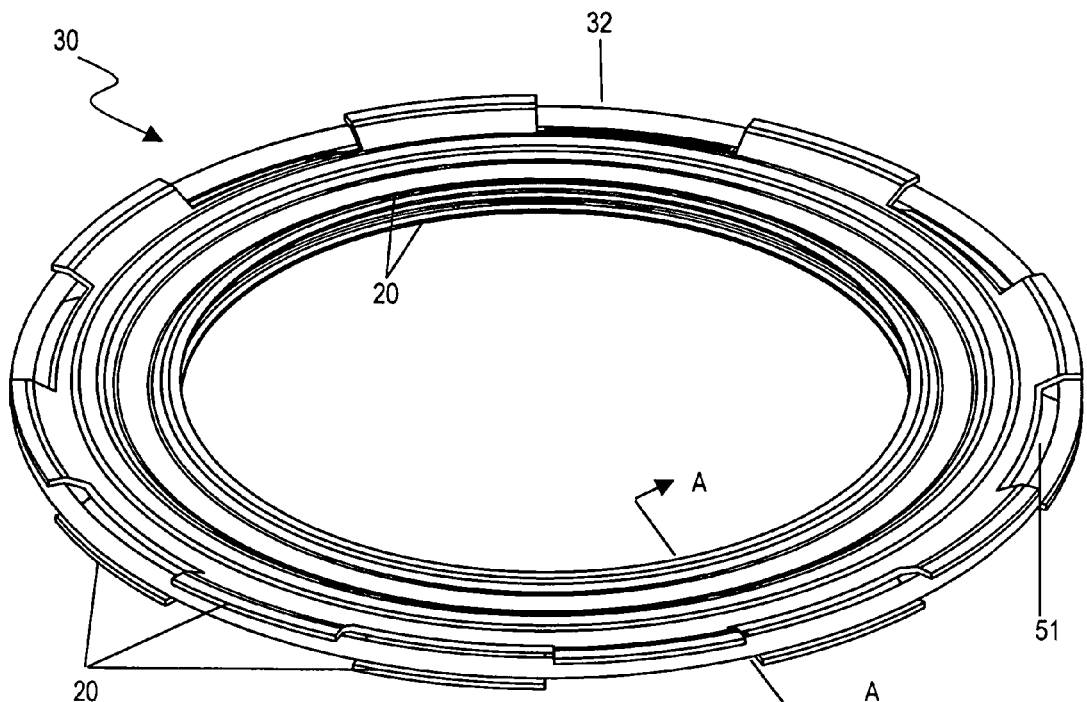
FIG. 5 is a perspective view of the coupling system of the invention shown in FIGS. 3 and 4.

Referring to FIG. 4, an exploded perspective view of FIG. 3 shows that a pair of flanges 20 have an area defined within for holding sealing structure 31, while locking ring 32 is positioned to be placed into a groove formed by fingers 21 as flanges 20 are mated together (called a "locking groove"). Referring to FIG. 5, the coupling system of the invention is shown with flanges 20 being mated together, each flange 20 having fingers 21 that interlock with the fingers 21 of the other flange 20, and locking ring 32 placed into a locking groove 51 defined in the outer circumference of mated flanges 20 to maintain a proper seal. In a preferred embodiment, coupling assembly 30 is designed to withstand a pressure differential of 3 to 4 atmospheres, although a typical operational differential will be closer to 1 atmosphere. Coupling assembly 30 may be uncoupled by simply removing locking ring 32 and unmating flanges 20. After unmating flanges 20, sealing structure 31 may be removed or replaced.

Figure 6:
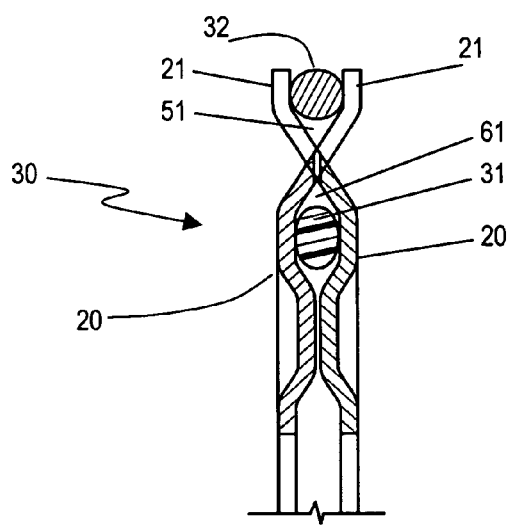
FIG. 6 is a partial cross-sectional plan view of the coupling system of the invention shown in FIG. 5.

Referring to FIG. 6, the coupling system of the invention is shown in partial cross-sectional plan view, the partial cross-section being along a line A—A as shown in FIG. 5. It can be seen in FIG. 6 that in coupling assembly 30, flanges 20 are mated together as mirror images of each other, with fingers 21 being offset from each other so that each finger 21 fits into a space 22 in the opposing flange 20. A sealing chamber 61 is defined by the inner contours of flanges 20 and inhabited by a sealing structure 31. Flanges 20 press against sealing structure 31 to create a high-integrity seal in coupling assembly 30. The mating of flanges 20 defines locking groove 51 between fingers 21, and an attachment mechanism or locking member such as locking ring 32 occupies locking groove 51 and provides a structure to maintain the high-integrity seal in coupling assembly 30.

Figure 7:
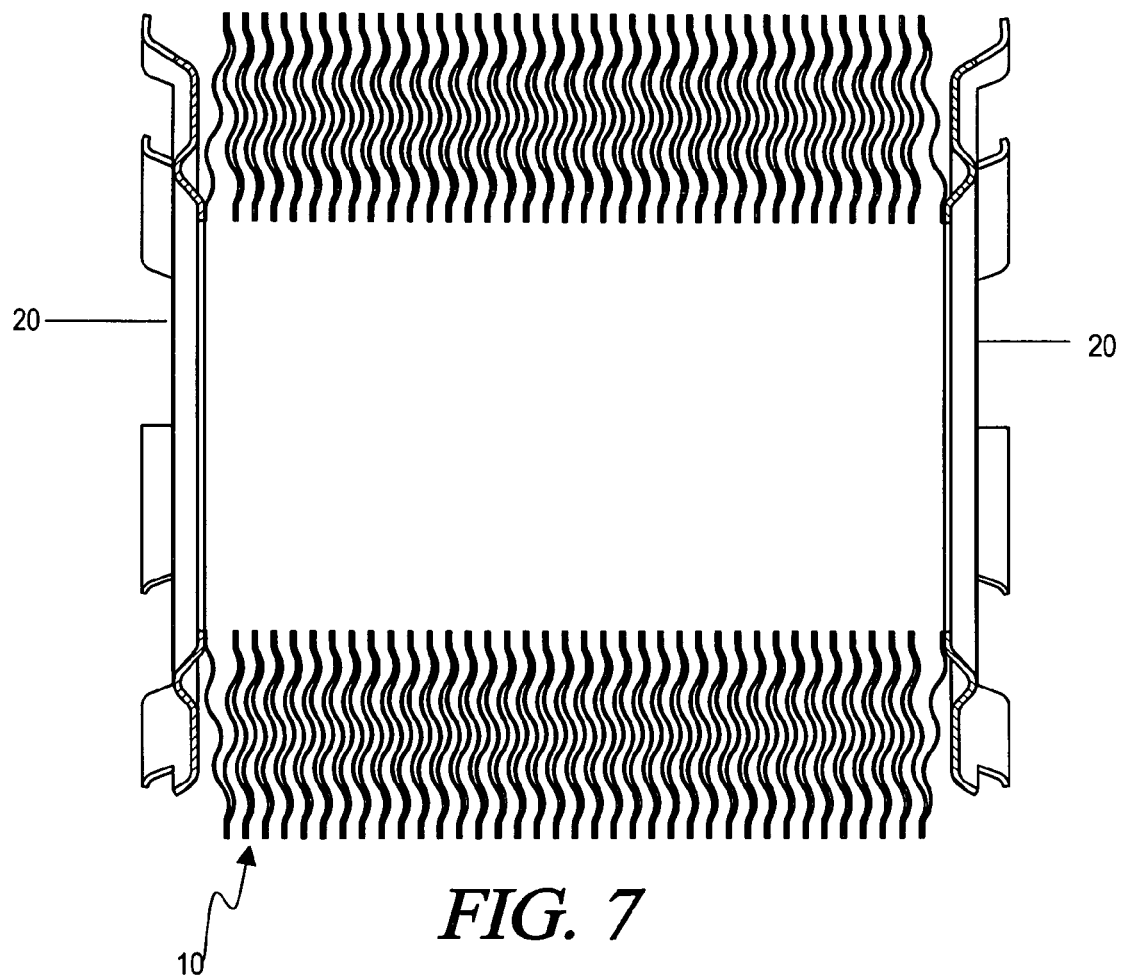
FIG. 7 is a cross-sectional plan view of an edge-welded bellows fitted at either end with the flange of FIG. 2.

Referring to FIG. 7, a bellows 10 is shown in cross-sectional plan view with a flange 20 fixed to either end by welding, or comparable fixing method. So arranged, bellows 10 is prepared to be incorporated in any application as desired. Bellows 10 may be of any size, or of one of various standard sizes, as needed to fit the particular application of interest. Perhaps the least important of the dimensions of bellows 10 is the length of bellows 10. The modular nature of the invention, and more particularly the thinness of the coupling assembly of the invention, allow for the combination of more than one bellows in an efficient manner to achieve desired bellows length without resorting to the costly and slow custom manufactured bellows of the prior art.

Figure 8:
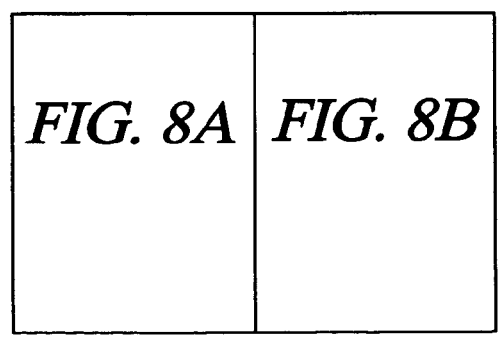
FIG. 8 is a block diagram showing how FIGS. 8A and 8B fit together.
Figure 8A:
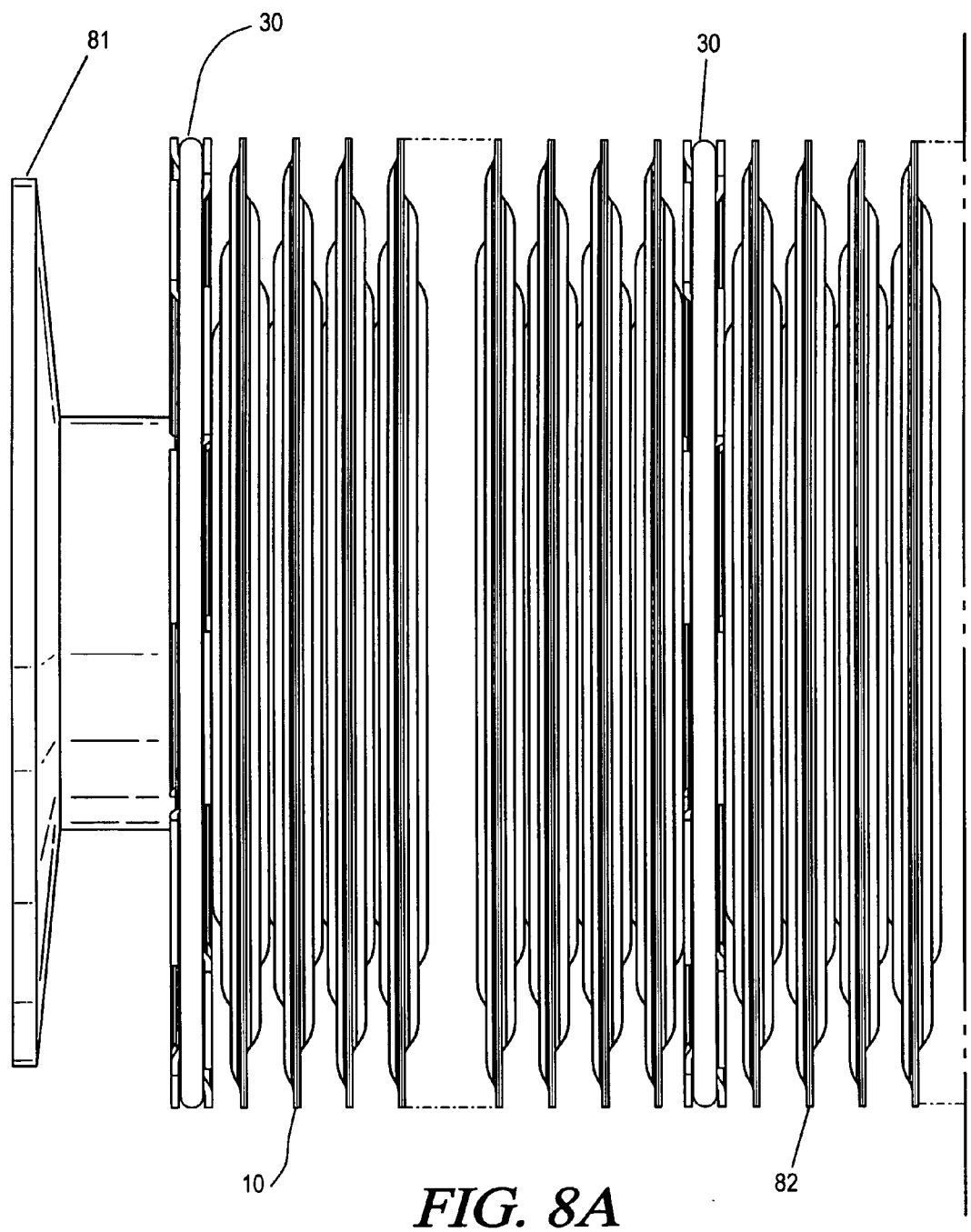
FIG. 8A is a plan side view of a first edge-welded bellows connected at one end to a first type of standard vacuum system component and at a second end to a second edge-welded bellows, both connections being made using the coupling system of FIGS. 3–6.
Figure 8B:
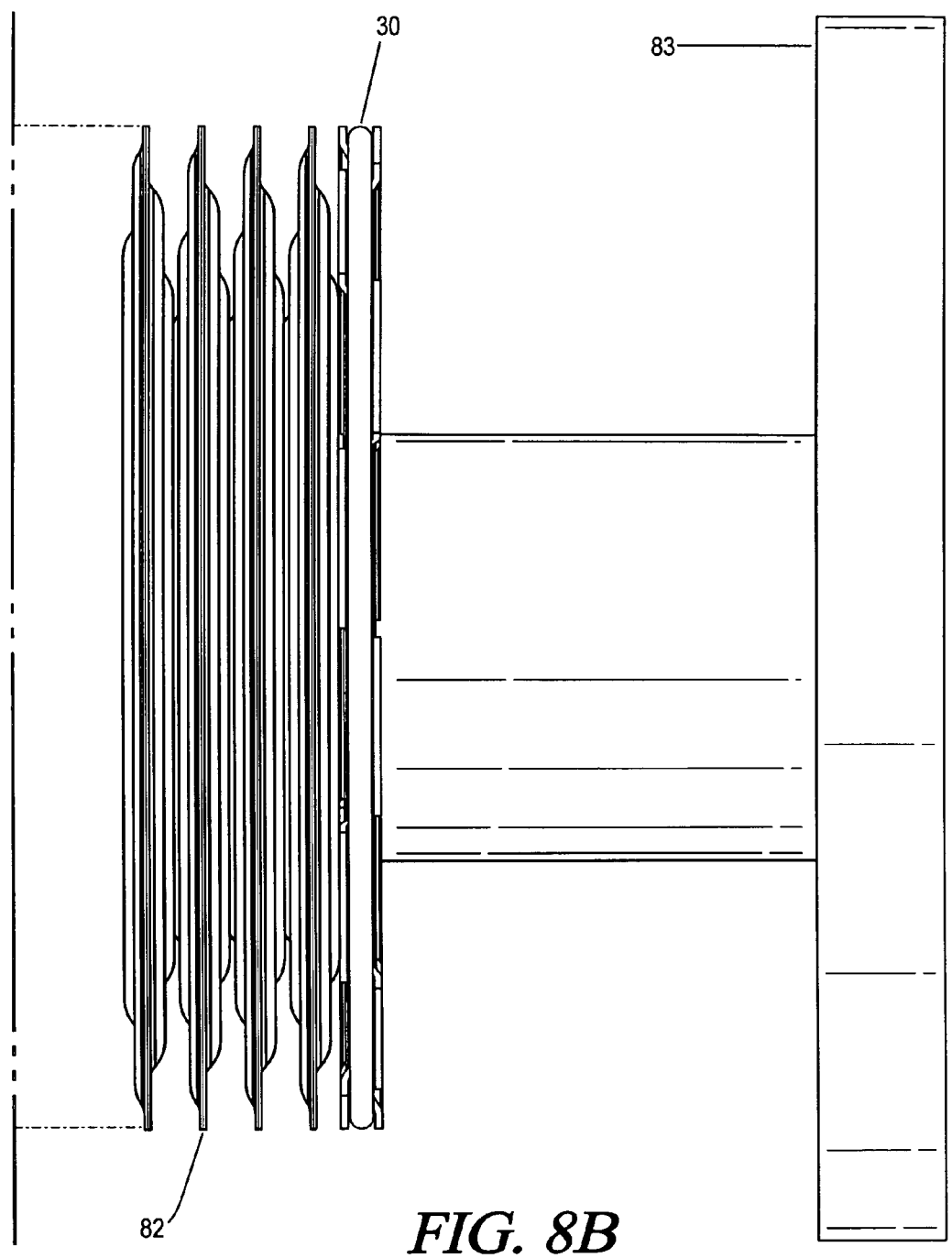
FIG. 8B is a plan view of the second edge-welded bellows of FIG. 8A connected to a second type of standard vacuum system component using the coupling system of FIGS. 3–6.

Installation of the system of the invention may be performed in any of a number of ways depending upon the application, but common features of the system of the invention will be that the releasable high-integrity seal occupying a minimum amount of space will allow a bellows to be releasably coupled to any standard vacuum component that would be required. Referring to FIG. 8, FIGS. 8A and 8B may be combined as shown to demonstrate the common couplings that may be achieved by employing the system of the invention.

Referring to FIG. 8A, a first bellows element 10 is coupled at one end to a first type of standard vacuum component, called a clamp flange 81, using the coupling assembly 30 of the invention. The other end of first bellows element 10 is coupled to a second bellows element 82, also using the coupling assembly 30 of the invention. Referring to FIG. 8B, second bellows element 82 continues and terminates at a third coupling assembly 30, which connects second bellows element 82 to a second type of standard vacuum component called a ConFlat® 83. Each of clamp flange 81, second bellows 82, ConFlat® 83, and any other type of object to be connected to first bellows element 10 in any application described herein may be functionally termed a "fluid handling component", any of which may be releasably coupled to first bellows element 10 in a time-, space-, and cost-efficient manner.

The system of the invention could alternatively be described as a kit including the following kit components: a first flange; a second flange; an elastomeric seal; and a releasable flange lock retainer. The first flange and the second flange functionally correspond to flanges 20 described above. The elastomeric seal functionally corresponds to sealing structure 31. The releasable flange lock retainer functionally corresponds to locking ring 32. Other components could be added to the kit, such as one or more bellows elements 10; additional flanges, elastomeric seals, or releasable flange lock retainers; or further fluid handling components as desired.

The invention could alternatively be described by the following method. First, a first flange and a second flange are provided, the first flange and the second flange being able to be locked together. Next, the first flange is fixed to a bellows and the second flange is fixed to a fluid handling component in the manner described above. A sealing structure is positioned between the first flange and the second flange. The first flange and the second flange are mated together with the sealing structure in between to form a seal between the first flange, the sealing structure, and the second flange. The outer portions of the first flange and the second flange have interlocking fingers defining a locking groove in the manner described above. Finally, a flange lock retainer is inserted into the locking groove to maintain the seal formed by the mating step. The flange lock retainer may be removed from the locking groove and the flanges may be unmated from each other at any time without damaging the system.

Thus, although there have been described particular embodiments of the present invention of a new and useful "Coupling System, Kit, and Method", it is not intended that such references be construed as limitations upon the scope of this invention except as set forth in the following claims.

What is claimed is:

1. A coupling system, comprising:
   a first metallic bellows element having an outside diameter;
   a fluid handling component; and
   a hermaphroditic coupling assembly comprising first and second connectors wherein said first connector and said second connector have an outside diameter which is equal to or less than an outside diameter of the first metallic bellows element, and said first and second connectors mate together to releasably connect the first metallic bellows element to the fluid handling component.

2. The system of claim 1, wherein the hermaphroditic coupling assembly further comprises an attachment mechanism for maintaining a secure connection between the first metallic bellows element and the fluid handling component.

3. The system of claim 1, wherein the hermaphroditic coupling assembly further comprises a sealing structure positioned between the first metallic bellows element and the fluid handling component for maintaining a secure connection between the first metallic bellows element and the fluid handling component.

4. The system of claim 3, wherein the sealing structure is positioned to form a seal proximate an effective diameter of the first metallic bellows element.

5. The system of claim 3, wherein the sealing structure is an elastomeric seal.

6. The system of claim 3, wherein the sealing structure is an O-ring.

7. The system of claim 1, wherein said first connector is attached to the first metallic bellows element and said second connector is attached to the fluid handling component, the first and second connectors alignable with each other to form a locking space.

8. The system of claim 7, wherein the hermaphroditic coupling assembly further comprises a locking member sized to fill the locking space.

9. The system of claim 1 wherein the fluid handling component is a second metallic bellows element.

10. The system of claim 1, wherein the fluid handling component is a machined coupling.

11. The system of claim 1, wherein the first connector has a first plurality of spaced fingers extending therefrom and the second connector has a second plurality of spaced fingers extending therefrom, the first plurality of spaced fingers adapted to interlock with the second plurality of spaced fingers to form a locking groove.

12. The system of claim 11, wherein the hermaphroditic coupling assembly further comprises a locking ring sized to occupy the locking groove.

13. A kit for connecting a metallic bellows element to a fluid handling component, comprising:
    a first connector having an outer diameter that is equal to or less than an outer diameter of said metallic bellows;
    a second connector substantially identical to the first and releasably matable to the first connector;
    an elastomeric seal adapted to be inserted between the mated first and second connectors; and
    a flange lock retainer for maintaining releasable matability between the first and second connectors.

14. The kit of claim 13, further comprising at least one metallic bellows element.

15. The kit of claim 13, further comprising at least one fluid handling system component.

16. A method for coupling a metallic bellows to a fluid handling component, comprising the steps of:
    (a) providing a first flange and a second flange, the first flange and the second flange being substantially identical and able to be locked together;
    (b) fixing the first flange to the metallic bellows;
    (c) fixing the second flange to the fluid handling component;
    (d) positioning a sealing structure between the first flange and the second flange;
    (d) mating the first flange and the second flange together to form a seal between the first flange and the sealing structure and the second flange, a portion of the first flange and the second flange defining a locking groove; and
    (e) releasably inserting a flange lock retainer into the locking groove to maintain the seal formed in step (d).

\* \* \* \* \*